Dec. 22, 1931. W. L. PATTERSON 1,837,993
MICROSCOPE EYE PIECE TUBE
Filed March 17, 1930

William L. Patterson
INVENTOR

BY G. A. Ellestad
ATTORNEY

Patented Dec. 22, 1931

1,837,993

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

MICROSCOPE EYE PIECE TUBE

Application filed March 17, 1930. Serial No. 436,270.

This invention relates to microscopes and more particularly it has reference to the eye piece tube which carries the ocular of a compound microscope.

In making a microscopic examination of certain specimens such as fluids, for example, it is often very desirable, if not absolutely essential, that the stage of the microscope, which carries the specimen, be maintained in a substantially horizontal position. Such a horizontal position of the stage, however, means that for a vast majority of microscopes the body tube will be vertically positioned so that the line of sight will also be vertical. In using such an instrument on a table, it is therefore necessary for the microscopist to sit very erect in order to enable him to look vertically down along the line of sight of the instrument. Such a position is uncomfortable and very tiring, especially to those who use the instrument for long periods of time, such as research workers or laboratory technicians, for example.

One of the objects of my invention is to provide means whereby light rays from a vertical tube of a microscope may be deflected at an angle to the vertical. Another object is to provide a simple and efficient device for a microscope whereby light rays from the body tube may be reflected into an angularly disposed eye piece tube. Still another object is to provide a simple, detachable device whereby a microscope having a vertically disposed eye piece tube can readily be altered to provide an inclined eye piece tube or vice versa. Other objects and advantages reside in certain novel features of construction, arrangement and combination of parts as will hereinafter be more fully described and pointed out in the appended claims.

Referring to the drawings.

Figure 1:
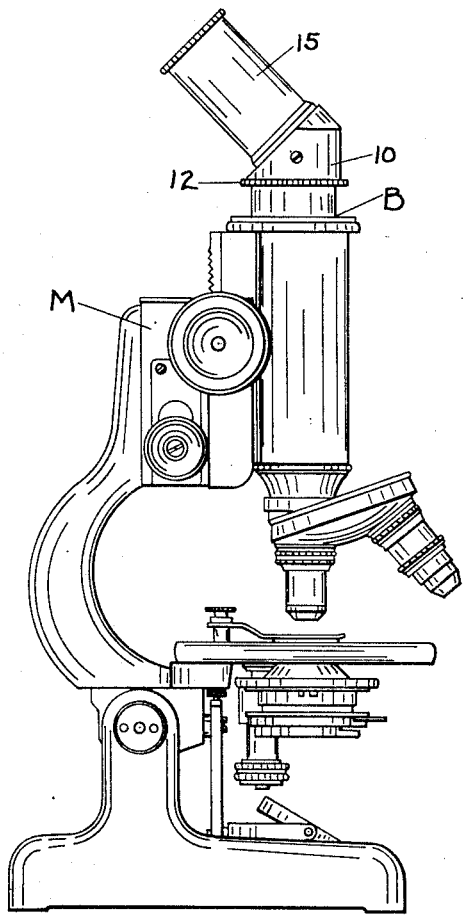
Fig. 1 shows a side elevation of a microscope embodying my invention.
Figure 2:
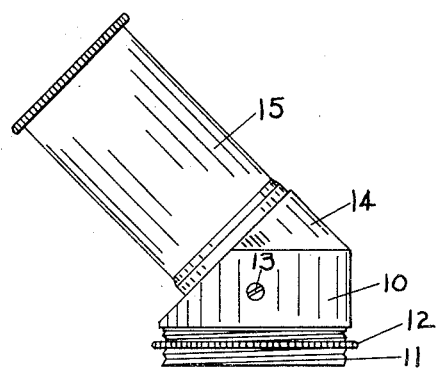
Fig. 2 is an enlarged side view showing my improved eye piece tube structure.
Figure 3:
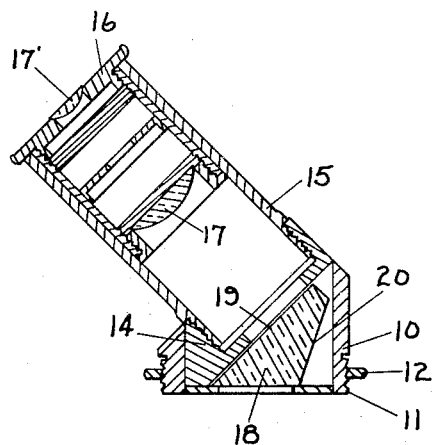
Fig. 3 is a vertical sectional view of the same.

A preferred embodiment of my invention is shown in the drawings wherein 10 indicates a bushing having a threaded portion 11 with a cooperating lock nut 12. Secured within bushing 12 by screws 13 is the block 14 which carries the angularly disposed eye piece tube 15. The usual ocular or eye piece 16, comprising lenses 17 and 17', is carried in the eye piece tube 15. Mounted within the block 14, by suitable means, not shown, is the reflecting prism 18 having the two reflecting surfaces 19 and 20.

In use, the usual vertical eye piece tube is unscrewed from the body tube of the microscope and my device is secured to the body tube B of a microscope M, as shown in Fig. 1, by means of the threaded portion 11 on bushing 10. Although in Fig. 1 the eye piece tube 15 is shown as rearwardly inclined, it may be positioned in any selected position by merely rotating the bushing 10 on its threaded portion 11 and then locking it against rotation by means of the lock nut 12.

In operation, light rays pass upwardly through the body tube B and into the prism 18 to the reflecting surface 19 where they are totally reflected, thence to the reflecting surface 20 and thence outwardly through the lenses 17 and 17' of the ocular 16. Thus, it will follow that due to the two successive reflections at surfaces 19 and 20, the image observed through the inclined ocular 16 will be inverted and reverted exactly the same as the image which is observed in the usual vertically disposed ocular. This is an important feature as it eliminates the chance of confusion which might result if the image observed through the inclined ocular were not inverted and reverted in the same manner as is the image which is observed through the usual type of ocular, all as is well known to those skilled in the art. Another feature of my invention resides in the fact that my device may be readily interchanged with the usual vertical eye piece tube.

From the foregoing it will be apparent that I am able to attain the objects of my invention and provide a simple, efficient device whereby the ocular of a microscope may be inclined to the axis of the body tube. Various modifications can obviously be made without departing from the spirit of my invention.

I claim:

1. A microscope having in combination a vertical body tube, a bushing member carried by said body tube, an angularly disposed eye piece tube mounted on said bushing member, reflecting means for diverting light rays from said body tube into said eye piece tube, said means comprising a prism having a horizontal face and two inclined faces whereby light rays from said body tube are reflected twice before entering said eye piece tube.

2. A microscope having in combination a vertical body tube, a bushing member rotatably mounted on said body tube, means for selectively locking said bushing member against rotation, an angularly disposed eye piece tube carried by said bushing member, a reflecting prism mounted in said bushing member for diverting light rays from said body tube into said eye piece tube, said prism having two reflecting surfaces for producing two successive reflections of light rays which pass from said body tube into said eye piece tube.

3. A microscope having in combination a vertical body tube, a bushing member threaded to said body tube, means for locking said member, an apertured block mounted within said bushing member, an angularly disposed tube carried by said block, an eye piece carried by said tube, a prism carried by said block, said prism having a horizontally disposed light receiving surface and two inclined reflecting surfaces whereby light rays from said body tube are successively reflected and directed into said eye piece.

WILLIAM L. PATTERSON.